United States Patent

Hayashi et al.

[11] Patent Number: 5,985,003
[45] Date of Patent: Nov. 16, 1999

[54] OXYGEN PRODUCTION PROCESS BY PRESSURE SWING ADSORPTION SEPARATION

[75] Inventors: Shin Hayashi, Furukawa; Masato Kawai, Yokohama, both of Japan

[73] Assignee: Nippon Sanso Corporation, Tokyo, Japan

[21] Appl. No.: 09/056,377

[22] Filed: Apr. 7, 1998

Related U.S. Application Data

[63] Continuation-in-part of application No. 08/586,789, Feb. 1, 1996, abandoned.

[30] Foreign Application Priority Data

Jun. 2, 1994 [JP] Japan .................................. 6-121015
Jun. 2, 1995 [WO] WIPO ...................... PCT/JP95/01083

[51] Int. Cl.$^6$ .................................................. B01D 53/047
[52] U.S. Cl. .............................. 95/101; 95/102; 95/105; 95/130
[58] Field of Search ................................ 95/96–105, 130

[56] References Cited

U.S. PATENT DOCUMENTS

| | | | |
|---|---|---|---|
| 3,430,418 | 3/1969 | Wagner | 55/25 |
| 3,564,816 | 2/1971 | Batta | 55/26 |
| 3,636,679 | 1/1972 | Batta | 55/26 |
| 4,077,780 | 3/1978 | Doshi | 55/66 |
| 4,340,398 | 7/1982 | Doshi et al. | 55/25 |
| 4,519,813 | 5/1985 | Hagiwra et al. | 55/26 |
| 4,650,501 | 3/1987 | Hiscock et al. | 55/26 |
| 4,684,377 | 8/1987 | Haruna et al. | 55/26 |
| 4,756,723 | 7/1988 | Sircar | 55/25 |
| 4,781,735 | 11/1988 | Tagawa et al. | 55/26 |
| 5,042,994 | 8/1991 | Smolarek | 55/18 |
| 5,294,247 | 3/1994 | Scharpf et al. | 95/101 |
| 5,328,503 | 7/1994 | Kumar et al. | 95/101 |
| 5,330,561 | 7/1994 | Kumar et al. | 95/101 |
| 5,393,326 | 2/1995 | Engler et al. | 95/103 |
| 5,411,578 | 5/1995 | Watson et al. | 95/101 |
| 5,429,666 | 7/1995 | Agrawal et al. | 95/103 |
| 5,520,720 | 5/1996 | Lemcoff | 95/96 |
| 5,529,611 | 6/1996 | Monereau et al. | 95/101 |
| 5,536,299 | 7/1996 | Girard et al. | 95/101 |
| 5,540,758 | 7/1996 | Agrawal et al. | 95/101 |
| 5,702,504 | 12/1997 | Schaub et al. | 95/130 X |
| 5,704,964 | 1/1998 | Kaneko et al. | 95/130 X |
| 5,713,984 | 2/1998 | Monnot et al. | 95/130 X |
| 5,733,359 | 3/1998 | Doong et al. | 95/130 X |
| 5,755,856 | 5/1998 | Miyake et al. | 95/130 X |

FOREIGN PATENT DOCUMENTS

| | | |
|---|---|---|
| 63-144103 | 6/1988 | Japan . |
| 63-144104 | 6/1988 | Japan . |

*Primary Examiner*—Robert Spitzer
*Attorney, Agent, or Firm*—Jacox, Meckstroth & Jenkins

[57] ABSTRACT

In order to provide a pressure-swing-adsorption oxygen production process which can maintain the product recovery at a high level while enhancing the oxygen productivity and reducing the unit power consumption, a pressure recovery step is carried out in which communication is provided between an outlet end of an adsorption column which has completed an adsorption step and an outlet end of an adsorption column which has completed a regeneration step, and in which gas remaining in the adsorption column which has completed the adsorption step is collected within the adsorption column which has completed the regeneration step; and simultaneously with the pressure recovery step, a gas mixture which has approximately the same composition as feed gas mixture is introduced into at least one of the adsorption column which has completed the adsorption step and the adsorption column which has completed the regeneration step through the inlet end thereof.

11 Claims, 5 Drawing Sheets

OXYGEN PRODUCTION PROCESS BY PRESSURE SWING ADSORPTION SEPARATION

CROSS-REFERENCES TO RELATED APPLICATIONS

This is a continuation-in-part application of application Ser. No. 08/586,789, filed Feb. 1, 1996 and abandoned.

BACKGROUND OF THE INVENTION

1. Field of the Invention

The present invention relates to a process for producing oxygen by means of a pressure swing adsorption separation, and more specifically, relates to a process for producing oxygen, having a purity of approximately 90%, from a gas mixture principally containing oxygen and nitrogen, such as air, by means of a pressure swing adsorption separation using an adsorbent capable of selective adsorption of nitrogen.

2. Description of Related Art

As processes for producing an oxygen enriched product by treating a gas mixture principally containing oxygen and nitrogen, such as air, processes for producing oxygen by means of pressure swing adsorption systems (hereinafter referred to as "oxygen PSA process") are widely employed. An oxygen PSA process is generally carried out by using an apparatus which is provided with a plurality of adsorption columns which are packed with zeolite as an adsorbent, which is capable of selective adsorption of nitrogen; such an oxygen PSA process is basically designed to continuously produce an oxygen enriched product by alternately repeating within each adsorption column an adsorption step, in which the operation is carried out at a relatively high pressure, and a regeneration step, in which the operation is carried out at a relatively low pressure.

Such an oxygen PSA apparatus enriches an oxygen product and separates it from air, making use of the highly selective adsorptivity of zeolite for nitrogen; however, since the adsorptivity of zeolite for oxygen is approximately the same as that for argon, the separated and enriched oxygen product contains argon, and has a concentration of approximately 95% at maximum.

On the other hand, with regard to the requirements of the users of this oxygen, in the case when oxygen is used for cutting a metal, oxygen having a concentration of not more than 99.5% causes problems in cutting speed and at the cut surface of materials; the Pharmaceutical Affairs Law in Japan specifies that oxygen concentration is required to be at least 99.5% for oxygen for medical use at hospitals or the like. However, since an oxygen concentration of not more than 95% is sufficient for steel manufacture or the like using an electric furnace, and since the oxygen concentration of about 90% is sufficient for most other applications for oxygen, the applicable range of the oxygen PSA process is very wide. Accordingly, for users for whom the oxygen concentration of about 90% is sufficient and who consume a large amount of oxygen, various improvements have been carried out in the PSA process in order to obtain oxygen at a lower cost.

In order to improve the performance of the oxygen PSA process, attention is directed to two points, namely: raising productivity of oxygen per unit amount of adsorbent to be used, so as to reduce the size of the apparatus; and enhancing product oxygen recovery so as to reduce the unit power consumption.

As described in the above, an oxygen PSA process comprises an adsorption step and a regeneration step as basic steps; in order to enhance oxygen recovery, a pressure recovery step (pressure equalization step), a re-pressurization step, or the like are usually added to the basic steps. Furthermore, there are some cases in which in place of the pressure recovery step, a cocurrent depressurization step is employed so as to utilize an enriched oxygen remaining within the adsorption column as a product or a purging gas; and there are other cases, in order to raise the productivity of oxygen per unit amount of adsorbent, in which a purging (vacuum purge) operation is carried out in the regeneration step with a part of a product gas so as to promote desorption of nitrogen from an adsorbent. This purging operation is a process to reduce the partial pressure of more strongly adsorbable component in the gas phase, thereby promoting the desorption of nitrogen, by way of supplying a part of product gas through an end of a product outlet at the stage when the pressure inside the adsorption column is lowered by evacuation; it is irrelevant whether the purging operation is employed in a regeneration process carried out at normal pressure or in a vacuum.

As an example of a conventional process carried out in order to improve the performance of an oxygen PSA process, Japanese Patent Application, First Publication (Kokai), Sho 63-144104, discloses a process in which a pressure equalization step is employed by which gases are recovered simultaneously from both an upper section (product gas outlet section) and a lower section (feed gas inlet section) of each of two adsorption columns which are connected (upper-lower simultaneous pressure equalization). When this is the case, a great amount of gas can be recovered; however, with regard to the adsorption column which receives the gas, a gas in which oxygen is relatively concentrated is collected within the upper section of the column, and air or a gas which has a nitrogen content higher to some degree than air is collected within the lower section of the column. Therefore, according to this process, the productivity of oxygen per unit amount of adsorbent is comparatively low, although the product recovery is high.

In addition, according to the disclosure in Japanese Patent Application, First Publication (Kokai), Sho 63-144103, in a pressure equalization step, gases are recovered simultaneously from both an upper section and a lower section of each of two adsorption columns which are connected in a similar manner to the above; at this time, the lower line regulates the recovery from the lower section of the column by way of evacuating a part of the gas which is recovered from the lower section by using a vacuum evacuation line. According to this process, problems arise in that the gas recovery is comparatively low in comparison with the above process, and thus the product recovery is not very high, as well as in that since the pressure increase due to the recovery within the column of the receiving side is low, the necessary amount of oxygen for product repressurization in the subsequent pressurization step becomes larger, and the adsorption pressure of the column which is producing oxygen in an adsorption step is reduced.

That is to say, with regard to an oxygen PSA process, since to maintain the product recovery at a high level and at the same time to enhance the productivity of oxygen per unit amount of adsorbent were mutually exclusive requirements, such a process as satisfies both has not been developed.

SUMMARY OF THE INVENTION

Accordingly, the object of the present invention is to provide a pressure-swing-adsorption oxygen production process which can maintain the product recovery at a high level while enhancing the oxygen productivity and reducing the unit power consumption.

In order to accomplish the above object, the present invention provides a process for producing oxygen by means of a pressure swing adsorption separation in a plurality of adsorption columns packed with zeolite as adsorbent, an adsorption step carried out at a relatively high pressure and a regeneration step carried out at or below atmospheric pressure are repeated alternately and sequentially, whereby oxygen and nitrogen are separated from a feed gas mixture principally containing oxygen and nitrogen, and oxygen gas is produced, the process comprising the steps of:

(a) introducing the feed gas mixture into a feed-gas-mixture inlet of a first adsorption column of packed zeolite, which is capable of selectively adsorbing nitrogen in the feed gas mixture, thereby allowing primarily adsorption of nitrogen, while withdrawing oxygen, which is less adsorbable, from a product-oxygen-gas outlet of the first adsorption column as a product oxygen gas, this step being continued until a mass transfer zone of nitrogen reaches the vicinity of the product-oxygen-gas outlet of the first adsorption column (step (a) may be referred to as "an adsorption step");

(b) depressurizing the first adsorption column to a pressure between an adsorbing pressure and a regenerating pressure of the first adsorption column by cocurrently taking out a gas in the mass transfer zone of the first adsorption column, the gas having an oxygen concentration lower than that of the product oxygen gas and higher than that of the feed gas mixture, from the product-oxygen-gas outlet of the first adsorption column, the gas thus taken out by this step of depressurization being guided to a product-oxygen-gas outlet of a second adsorption column undergoing step (e) for repressurization (step (b) may be referred to as "a cocurrent depressurization step"; the step undertaken by the first adsorption column in steps (b) and the second adsorption column in step (e) together may be referred to as "a pressure equalization step" or "a pressure recovery step");

(c) further depressurizing the first adsorption column by countercurrently evacuating it through the feed-gas-mixture inlet thereof by a vacuum pump, thereby allowing the adsorbed nitrogen to be desorbed (step (c) may be referred to as "a vacuum regeneration step);

(d) countercurrently purging the first adsorption column by guiding a product oxygen gas produced in another adsorption column undergoing step (a) to the product-oxygen-gas outlet of the first adsorption column so as to be supplied to the first adsorption column, whereby the desorption of the adsorbed nitrogen by the evacuation using the vacuum pump is further promoted (step (d) may be referred to as "a purge regeneration step" or "a vacuum purge regeneration step");

(e) pressurizing the first adsorption column by countercurrently supplying the product-oxygen-gas outlet of the first adsorption column with a gas in a mass transfer zone of an adsorption column other than the first adsorption column, the gas having an oxygen concentration lower than that of a product oxygen gas and higher than that of a feed gas mixture of the adsorption column other than the first adsorption column, and at the same time by cocurrently supplying the feed-gas-mixture inlet of the first adsorption column with the feed gas mixture (step (e) may be referred to as "a primary pressurization step"; the step undertaken by the first adsorption column in step (e) and the adsorption column in step (b) other than the first adsorption column together may be referred to as "a pressure equalization step" or "a pressure recovery step");

(f) further pressurizing the first adsorption column with a portion of a product oxygen gas from an adsorption column other than the first adsorption column (step (f) may be referred to as "a secondary pressurization step"); and (g) performing steps (a) through (f) of in each of the plurality of adsorption columns in a phased sequence.

DESCRIPTION OF THE PREFERRED EMBODIMENTS

In the process according to the present invention as described above, the gas supplied to the feed-gas-mixture inlet of the first adsorption column in step (e) may be a feed gas mixture which is not compressed.

The cocurrent supply of the feed gas mixture to the feed-gas-mixture inlet of the first adsorption column with in step (e) may be continued in step (f). In this case, the gas supplied to the feed-gas-mixture inlet of the first adsorption column in steps (e) and (f) may be a feed gas mixture which is not compressed.

Also, in the process according to the present invention, step (b) may be conducted by depressurizing the first adsorption column to a pressure between an adsorbing pressure and a regenerating pressure of the first adsorption column by cocurrently taking out a gas in the mass transfer zone of the first adsorption column, the gas having an oxygen concentration lower than that of the product oxygen gas and higher than that of the feed gas mixture, from the product-oxygen-gas outlet of the first adsorption column, and at the same time by countercurrently evacuating the first adsorption column through the feed-gas-mixture inlet thereof by a vacuum pump; the gas thus taken out from the product-oxygen-gas outlet of the first adsorption column by the depressurization in step (b) being guided to a product-oxygen-gas outlet of a second adsorption column undergoing step (e) for repressurization.

In a first modification of a process for producing oxygen by means of a pressure swing adsorption separation according to the present invention, the process comprises the steps of:

(a) introducing the feed gas mixture into a feed-gas-mixture inlet of a first adsorption column of packed zeolite, which is capable of selectively adsorbing nitrogen in the feed gas mixture, thereby allowing primarily adsorption of nitrogen, while withdrawing oxygen, which is less adsorbable, from a product-oxygen-gas outlet of the first adsorption column as a product oxygen gas, this step being continued until a mass transfer zone of nitrogen reaches the vicinity of the product-oxygen-gas outlet of the first adsorption column;

(b) cocurrently taking out a gas in the mass transfer zone of the first adsorption column, the gas having an oxygen concentration lower than that of the product oxygen gas and higher than that of the feed gas mixture, from the product-oxygen-gas outlet of the first adsorption column, while supplying the feed-gas-mixture inlet of the first adsorption column with a compressed feed gas mixture so as to avoid depressurization in the first adsorption column; the gas thus taken out by this step being guided to a product-oxygen-gas outlet of a second adsorption column undergoing step (e) for repressurization;

(c) further depressurizing the first adsorption column by countercurrently evacuating it through the feed-gas-mixture inlet thereof by a vacuum pump, thereby allowing the adsorbed nitrogen to be desorbed;

(d) countercurrently purging the first adsorption column by guiding a product oxygen gas produced in another adsorption column undergoing step (a) to the product-oxygen-gas outlet of the first adsorption column so as to be supplied to the first adsorption column, whereby the desorption of the adsorbed nitrogen is further promoted;

(e) pressurizing the first adsorption column by countercurrently supplying the product-oxygen-gas outlet of the first adsorption column with a gas in a mass transfer zone of an adsorption column other than the first adsorption column, the gas having an oxygen concentration lower than that of a product oxygen gas and higher than that of a feed gas mixture of the adsorption column other than the first adsorption column;

(f) further pressurizing the first adsorption column with a portion of a product oxygen gas from an adsorption column other than the first adsorption column; and (g) performing steps (a) through (f) of in each of the plurality of adsorption columns in a phased sequence.

In a second modification of a process for producing oxygen by means of a pressure swing adsorption separation according to the present invention, the process comprises the steps of:

conducting pressure recovery in which communication is provided between an outlet end of a column which has completed the adsorption step and an outlet end of a column which has completed the regeneration step, and in which gas remaining in the column which has completed the adsorption step is collected in the column which has completed the regeneration step; and simultaneously with the pressure recovery, introducing the gas mixture into at least one of the column which has completed the adsorption step and the column which has completed the regeneration step through the inlet end thereof.

In a third modification of a process for producing oxygen by means of a pressure swing adsorption separation according to the present invention, the process comprises the steps of:

conducting pressure recovery in which communication is provided between an outlet end of a column which has completed the adsorption step and an outlet end of a column which has completed the regeneration step, and in which gas remaining in the column which has completed the adsorption step is collected in the column which has completed the regeneration step; and simultaneously with the pressure recovery, introducing the gas mixture into the column which has completed the regeneration step through the inlet end thereof, while the inlet end of the column which has completed the adsorption step is closed.

In a fourth modification of a process for producing oxygen by means of a pressure swing adsorption separation according to the present invention, the process comprises the steps of:

conducting pressure recovery in which communication is provided between an outlet end of a column which has completed the adsorption step and an outlet end of a column which has completed the regeneration step, and in which gas remaining in the column which has completed the adsorption step is collected in the column which has completed the regeneration step; and simultaneously with the pressure recovery, introducing the gas mixture into the column which has completed the adsorption step through the inlet end thereof, while the inlet end of the column which has completed the regeneration step is closed.

In the above second or fourth modification, the column into which the gas mixture is introduced may be the column which has completed the adsorption step, and the gas mixture is introduced at approximately the same pressure as that in the adsorption step.

In a fifth modification of a process for producing oxygen by means of a pressure swing adsorption separation according to the present invention, the process comprises the steps of:

conducting pressure recovery in which communication is provided between an outlet end of a column which has completed the adsorption step and an outlet end of a column which has completed the regeneration step, and in which gas remaining in the column which has completed the adsorption step is collected in the column which has completed the regeneration step; and simultaneously with the pressure recovery, introducing the gas mixture into both the column which has completed the adsorption step and the column which has completed the regeneration step through inlet ends of both columns respectively.

In the following, the present invention will be explained in detail on the basis of the embodiments, which are shown in the drawings.

Figure 1:
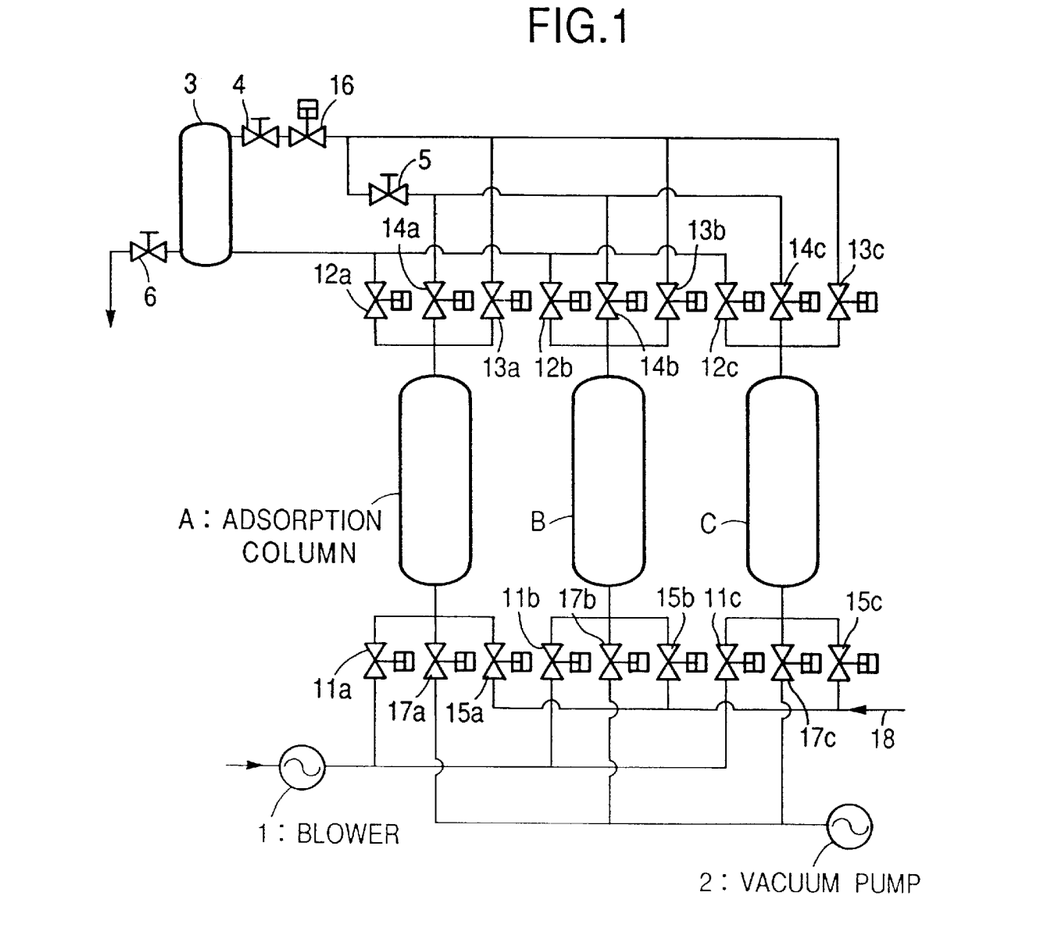
FIG. 1 is a flow diagram showing an example of an oxygen PSA apparatus.

FIG. 1 is an example of an oxygen PSA apparatus for carrying out the method of the present invention; FIG. 1 shows a three-column-type oxygen PSA apparatus which has three adsorption columns A, B, and C, each of which are packed with zeolite as an adsorbent, so as to separate and produce oxygen from air, which is a gas mixture principally containing oxygen and nitrogen.

This oxygen PSA apparatus is provided with: the aforementioned three adsorption columns A, B, and C; a blower 1 which increases the pressure of feed air to a predetermined pressure and supplies the feed air to the aforementioned adsorption columns; a vacuum pump 2 which carries out vacuum evacuation of the aforementioned adsorption columns; a product reservoir 3 for temporarily reserving product oxygen withdrawn from these adsorption columns; flow rate control valves 4 and 5 for controlling the gas flow rates in a regeneration step and a pressurization step; flow rate control valve 6 for controlling the product gas supply amount; automatic valves 11, 12, 13, 14, 15, 16, and 17 for switching each adsorption column to an adsorption step, regeneration step, or the like; and an air introduction pipe 18 for introducing air from atmosphere directly into the adsorption columns (valves attached to adsorption columns A, B, and C are respectively labeled "a", "b", and "c").

Figure 2:
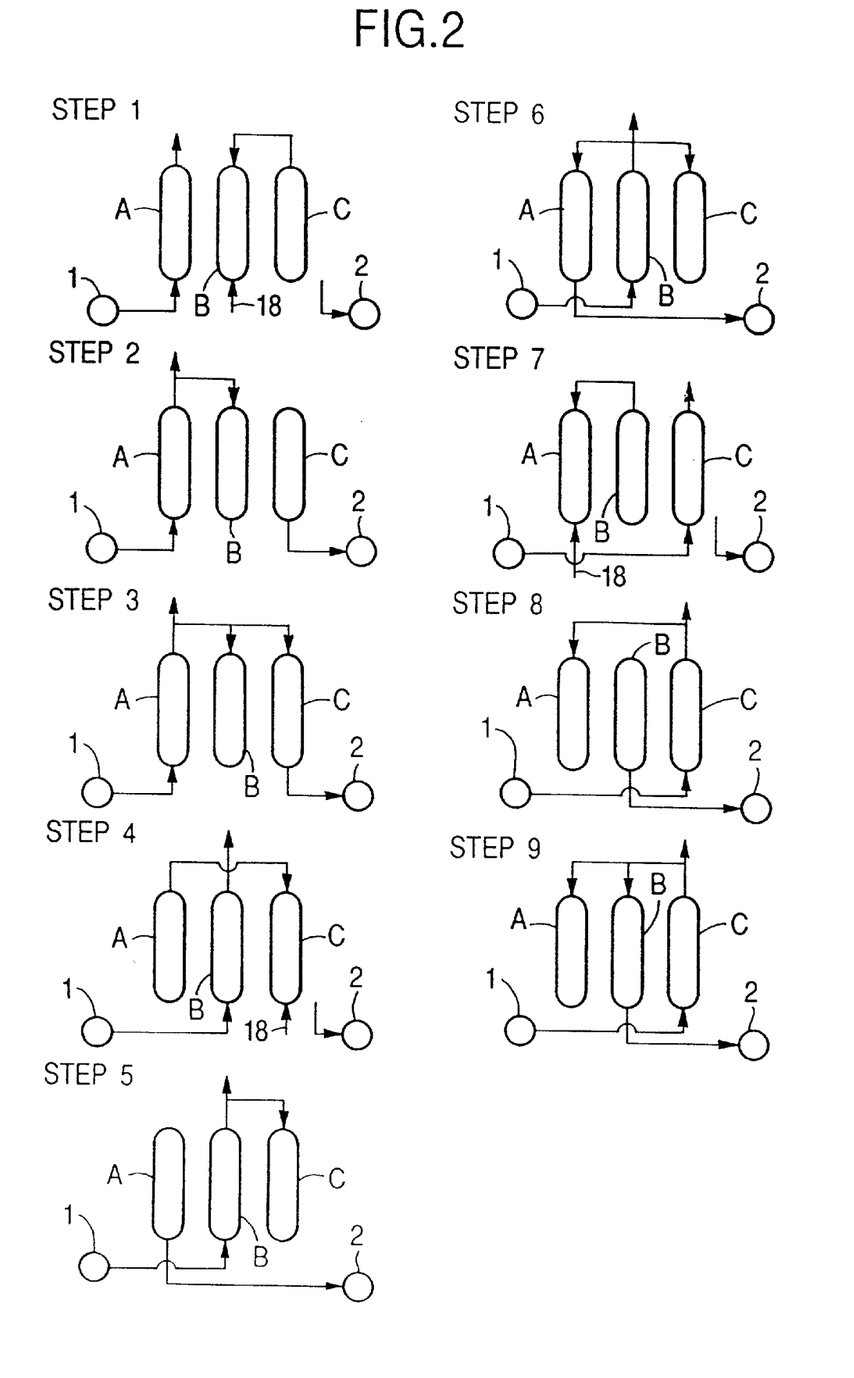
FIG. 2 is a process diagram showing the first embodiment of the present invention.

The above oxygen PSA apparatus opens and closes the aforementioned automatic valves in predetermined order, and continuously produces an oxygen gas; for example, by repeating the nine steps shown in FIG. 2, oxygen and nitrogen in a gas mixture principally containing oxygen and nitrogen, such as air, are separated, and product oxygen is produced.

In the following, the first embodiment of an oxygen production process according to the present invention will be explained on the basis of the process diagram shown in FIG. 2, in which the above oxygen PSA apparatus is employed.

First, step 1 is in a state in which the adsorption column A is switched to an adsorption step, the adsorption column B is switched to a pressure recovery step (which may otherwise be referred to as "a primary pressurization step" or "a pressure equalization step") after a regeneration step has been completed, and the column C is switched to a pressure recovery step after an adsorption step has been completed. The separation of oxygen and nitrogen is carried out within the adsorption column A.

That is to say, feed air is introduced by the blower 1, the pressure of which has been increased to a predetermined pressure, for example, 500 mmAq (approximately 800 Torr), into the adsorption column A through the valve 11a, nitrogen in the air is adsorbed by the zeolite packed in the column so as to separate oxygen, and this oxygen, which is a less strongly adsorbable component, is withdrawn as product oxygen through the valve 12a. The product oxygen is temporarily reserved in the product reservoir 3, and is then supplied to a point of use of the product oxygen via the valve 6. The mass transfer zone (adsorption zone) which was in the vicinity of the inlet for the feed air in an early stage of step 1 proceeds toward the outlet for the product oxygen as the feed air is introduced into the adsorption column A.

In addition, with regard to the adsorption column B having a column pressure lower than atmospheric pressure, and the adsorption column C having a column pressure which is relatively higher, pressure recovery is carried out by communicating outlet ends of both columns with each other, so that the gas within the adsorption column C, the flow rate of which is adjusted by the flow rate control valve 5 (see FIG. 1), passes through the valve 13c and is introduced into the adsorption column B through the valve 14b, while through the inlet side of the adsorption column B, air from the air introduction pipe 18 at atmospheric conditions is admitted via the valve 15b. During this operation, all the valves at the inlet (lower) side of the adsorption column B are closed. Accordingly, within the adsorption column B, a primary pressurization step is carried out in which the gas within the adsorption column C, which is relatively rich in oxygen, is recovered within the outlet (upper) side of the adsorption column B while feed air is received through the inlet side of the adsorption column B without pressurization by the blower 1.

In step 2, the adsorption column A remains in the adsorption step in which the bottom of the adsorption column A receives compressed feed air via the valve 11a, and the adsorption column A generates product oxygen from the top of the column which passes through the valve 12a, while the proceeding of the mass transfer zone toward the outlet of the adsorption column A in step 1 continues. The adsorption column B is in a secondary pressurization step in which the top of the column receives a part of the product oxygen produced by the adsorption column A via the product reservoir 3 and the valves 4, 16, and 13b. In addition, the adsorption column C is in a vacuum regeneration step in which gas within the column is evacuated through the valve 17c using the vacuum pump 2, whereby the lowered inside pressure of the column C allows nitrogen content which has been adsorbed by the adsorbent to be desorbed.

In step 3, the adsorption column A remains in the adsorption step, in which the introduction of the feed air and the withdrawal of the product oxygen continue until the mass transfer zone reaches the outlet portion of the column. The adsorption column B remains in the secondary pressurization step, in which the pressurization is carried out until the pressure finally reaches a pressure of the column in the step of adsorbing. The adsorption column C is in a state of a so-called "vacuum purge" (purge regeneration step), in which at the time after the evacuation by the vacuum pump 2 has proceeded and when the degree of vacuum becomes relatively high, the top section of the column C receives a part of product oxygen which is produced from the adsorption column A via the valves 4, 16, 5, and 14c.

In step 4, the adsorption column A enters into a pressure recovery step, which is the same step that the adsorption column C was undergoing in step 1. Gas in the mass transfer zone in the upper portion of the adsorption column A having an oxygen concentration lower than that of the product gas and higher than that of the feed gas is withdrawn from the top of the column via the valve 13a without supplying feed air to the adsorption column A (the valves 11a, 17a, and 15a attached to the lines which are connected to the bottom of the adsorption column A are all closed), and is sent to the top portion of the adsorption column C to be recovered therein via the valves 5 and 14c (pressure equalization step, pressure recovery step). At the same time, the inlet of the adsorption column C admits air under atmospheric pressure from the air introduction pipe 18 via the valve 15c, and the adsorption column C undertakes the primary pressurization step. The adsorption column B is in an adsorption step, which is the same step that the adsorption column A was undergoing in step 1.

In step 5, the adsorption column A undertakes a vacuum regeneration step in which gas inside the adsorption column A is withdrawn via the valve 17a by the vacuum pump 2, and the thus-lowered pressure inside the column allows nitrogen adsorbed by the adsorbent to be desorbed. The mass transfer zone which has been completely reached the top portion of the adsorption column A in the pressure recovery step of step 4 gradually moves toward the air inlet of the adsorption column A when nitrogen is desorbed as the vacuum evacuation proceeds. The adsorption column B continues the adsorption in the previous step sending out the product oxygen. The adsorption column C undertakes a secondary pressurization, using a part of the product oxygen withdrawn from the adsorption column B.

In step 6, the adsorption column A undertakes a vacuum purge in which while the adsorption column A continues to be evacuated via the valve 17a below the adsorption column A by the vacuum pump 2, the top of the column receives a part of the product oxygen withdrawn from the adsorption column B via the product reservoir 3 and the valves 4, 16, 5, and 14a. Pressure reduction due to the evacuation allows nitrogen adsorbed to be desorbed, and the product oxygen supplied through the outlet of the adsorption column A pushes down the thus-desorbed nitrogen toward the feed inlet end. The adsorption column B continues the adsorption in the previous step. The adsorption column C continues the secondary pressurization, using a part of the product oxygen withdrawn from the adsorption column B.

In step 7, pressure recovery is undertaken between the adsorption column A, the inside of which is under a pressure lower than atmospheric pressure due to the regeneration step conducted in step 6 and earlier steps, and the adsorption column B, the inside of which has a relatively higher pressure due to the adsorption step conducted in step 6 and earlier steps, by communicating the outlet ends of the adsorption columns A and B with each other. The gas within the adsorption column B passes through the valve 13b, the flow rate of the gas being adjusted by the flow rate control valve 5, and is introduced into the adsorption column A via the valve 14a. At the same time, the inlet of the adsorption column A admits air at atmospheric conditions from the air introduction pipe 18 via the valve 15a. During this operation, all the valves at the inlet side of the adsorption column B are closed. Accordingly, within the adsorption column A, a primary pressurization step is carried out in which the gas within the adsorption column B, which is relatively rich in oxygen, is recovered within the outlet side of the adsorption column A while feed air is received through the inlet side of the adsorption column A without pressurization by the blower 1. The adsorption column C starts an adsorption step in which air pressurized by the blower 1 is supplied, and product oxygen is removed through the valve 12c.

In step 8, the adsorption column A starts a secondary pressurization step in which the top of the column receives a part of the product oxygen removed from the adsorption column C under the adsorption step via the product reservoir 3 and the valves 4, 16, and 13a. The adsorption column B starts to be evacuated through the valve 17b by the vacuum pump 2. The adsorption column C continues the adsorption step in step 7.

In step 9, the adsorption column A continues the secondary pressurization in step 8 using the product oxygen. The adsorption column B undertakes a vacuum purge in which the top of the column receives a part of the product oxygen withdrawn from the adsorption column C via the product reservoir 3 and the valves 4, 16, 5, and 14b, while the column is evacuated through the feed inlet end thereof and the valve 17b by the vacuum pump 2. The adsorption column C continues the adsorption step in step 8.

Accordingly, continuous oxygen production is carried out by conducting steps 1–9 within each adsorption column and by returning from step 9 to step 1 so as to repeat the steps. When the cycle time is 60 seconds, the duration of each step is normally 5–10 seconds for steps 1, 4, and 7, 10–15 seconds for steps 2, 5, and 8, and 40–45 seconds for steps 3, 6, and 9. In addition, with regard to the pressure of each step, normally, the adsorption pressure is approximately 500 mmAq (approximately 800 Torr), the vacuum regeneration pressure is approximately 200 Torr, the final pressure of the primary pressurization step is 500 Torr, and the final pressure of the secondary pressurization step is approximately 760 Torr.

In the pressure recovery step, as shown in this embodiment, by communicating an outlet end of an adsorption column, which has completed an adsorption step and has a relatively high column pressure, with an outlet end of an adsorption column which has completed a regeneration step and has a column pressure lower than atmospheric pressure, then collecting gas within the upper section of the adsorption column which has completed the adsorption step into the adsorption column which has completed the regeneration step through the top section of the column, and then admitting air at atmospheric conditions through the bottom of this adsorption column, gas within the adsorption column which has completed the adsorption step, being rich in oxygen, can be collected within the adsorption column which has completed the regeneration step, and pressurization of this column can be carried out effectively.

That is to say, the adsorption column which has completed a regeneration step should be pressurized to a pressure as close to the adsorption pressure as possible by the aforementioned primary and secondary pressurization step before a subsequent adsorption step begins; as mentioned in the above, in a primary pressurization step, by collecting gas, which is rich in oxygen, within the upper section of the adsorption column which has completed a regeneration step, and by admitting air through the bottom of the column, the pressure of this adsorption column can be raised sufficiently as well as maintaining a desirable amount of recovered gas. Accordingly, at the time when the secondary pressurization step begins, in this step a part of product oxygen being used, it is possible to increase the pressure of the adsorption column above that according to the conventional process, and it is possible to reduce the amount of product oxygen to be used for product pressurization.

By the above-mentioned reduction in the amount of product oxygen to be used for pressurization, adsorption operation of an adsorption column in an adsorption step can be carried out in a stable condition, and the amount of product oxygen produced can be increased. Moreover, since the air admitted into the adsorption column in the primary pressurization step has the same composition as the feed gas mixture, and in addition, since this air is admitted into the adsorption column by the pressure difference between a negative pressure inside the adsorption column and atmospheric pressure, without using the blower 1, a compression force by means of the blower 1 is not necessary, and the amount of air actually processed is greater than that according to a conventional process using a blower, and therefore a reduction in the cost of power and an increase in the amount of product oxygen produced are possible.

Figure 3:
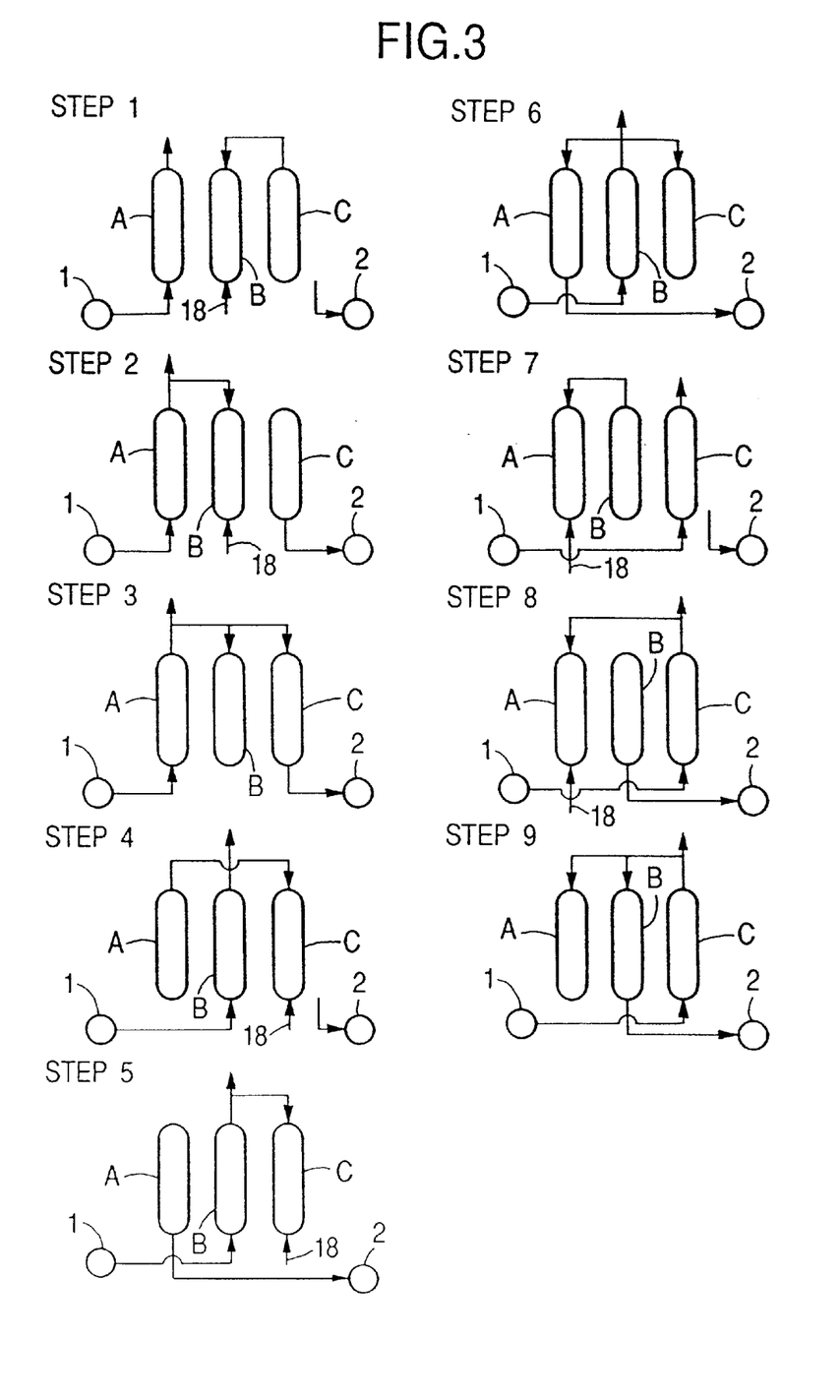
FIG. 3 is a process diagram showing the second embodiment of the present invention.

FIG. 3 is a process diagram showing the second embodiment of the present invention, which, in contrast to the above-described first embodiment, is designed so as to continue the admission of air until the column pressure nears atmospheric pressure during the operation of the secondary pressurization step. It should be added that in the following embodiment, detailed explanations of parts which are similar to those in the first embodiment are omitted.

In step 1, the adsorption column A is in a state in which it is switched to an adsorption step where the separation of oxygen and nitrogen is conducted; the adsorption column B is in a state in which it is switched to a pressure recovery step after a regeneration step has been completed; and an adsorption column C is in a state in which it is switched to a pressure recovery step after an adsorption step has been completed. That is to say, feed air is introduced by the blower 1, the pressure of which has been increased to a predetermined pressure, for example, 500 mmAq (approximately 800 Torr), into the adsorption column A through the valve 11a, nitrogen in the air is adsorbed by the zeolite packed in the column so as to separate oxygen, and this oxygen, which is a less strongly adsorbable component, is withdrawn as product oxygen through the valve 12a. The mass transfer zone which was in the vicinity of the inlet for the feed air in an early stage of step 1 proceeds toward the outlet for the product oxygen as the feed air is introduced into the adsorption column A.

In addition, with regard to the adsorption column B having a column pressure lower than atmospheric pressure, and the adsorption column C having a column pressure which is relatively higher, pressure recovery is carried out by communicating outlet ends of both columns with each other, so that the gas within the adsorption column C, the flow rate of which is adjusted by the flow rate control valve 5 (see FIG. 1), is introduced into the adsorption column B through the valve 14b, while through the inlet side of the adsorption column B, air from the air introduction pipe 18 at atmospheric conditions is admitted via the valve 15b. During this operation, all the valves at the inlet (lower) side of the adsorption column B are closed. Accordingly, within the adsorption column B, a primary pressurization step is carried out in which the gas within the adsorption column C, which is relatively rich in oxygen, is recovered within the outlet (upper) side of the adsorption column B while feed air is received through the inlet side of the adsorption column B without pressurization by the blower 1.

In step 2, the adsorption column A remains in the adsorption step in which the bottom of the adsorption column A receives compressed feed air via the valve 11a, and the adsorption column A generates product oxygen from the top of the column which passes through the valve 12a, while the proceeding of the mass transfer zone toward the outlet of the adsorption column A in step 1 continues. The adsorption column B is in a secondary pressurization step in which the top of the column receives a part of the product oxygen produced by the adsorption column A via the product reservoir 3 and the valves 4, 16, and 13b; however, at the same time when the top of the adsorption column B receives oxygen, the feed inlet of the column receives air via the valve 15b. Accordingly, within the adsorption column B, a secondary pressurization is carried out with the product oxygen within the upper section of the column and the air within the bottom of the column. In addition, the adsorption column C is in a vacuum regeneration step in which gas within the column is evacuated through the valve 17c using the vacuum pump 2, whereby the lowered inside pressure of the column C allows nitrogen content which has been adsorbed by the adsorbent to be desorbed.

In step 3, the adsorption column A remains in the adsorption step in which the introduction of the feed air and the withdrawal of the product oxygen continue until the mass transfer zone reaches the outlet portion of the column. The adsorption column B remains in the secondary pressurization step, in which the pressurization is carried out until the pressure finally reaches a pressure of the column in the step of adsorbing. However, within this adsorption column B, the admission of air through the bottom of the column is stopped, and pressurization is carried out merely by the reception of a part of product oxygen from the top section of the column, corresponding to the column pressure. The adsorption column C is in a state of a so-called "vacuum purge" (purge regeneration step), in which at the time after the evacuation by the vacuum pump 2 has proceeded and when the degree of vacuum becomes relatively high, the top section of the column C receives a part of product oxygen which is produced from the adsorption column A via the valves 4, 16, 5, and 14c.

Subsequently, as in the above-described first embodiment, in step 4, the adsorption column A is in a pressure recovery step (cocurrent depressurization), which is the same step that the adsorption column C was undergoing in step 1; the adsorption column B is in an adsorption step, which is the same step that the adsorption column A was undergoing in step 1; and the adsorption column C is in a primary pressurization step, which is the same step that the adsorption column B was undergoing in step 1; in step 5, the adsorption column A is in a vacuum regeneration step, and the adsorption column C is in a secondary pressurization step; and in step 6, the adsorption column A is in a purge regeneration step. Furthermore, in steps 7, 8, and 9, the adsorption columns C, A, and B are in such states as those which the adsorption columns A, B, and C were undergoing, respectively, in steps 1–3; and then after step 9 is completed, each adsorption column returns to step 1.

As shown in this embodiment, since by continuing admission of air additionally in the secondary pressurization step until the column pressure nears atmospheric pressure, the admission amount of air is greater than that according to the above-described first embodiment, the amount of product oxygen necessary for the pressurization is furthermore reduced, and the amount of product oxygen produced can be increased even more. It should be added that in the secondary pressurization step, the pressure under which the admission of air is stopped can be near atmospheric pressure, however, approximately 600–700 Torr is appropriate.

Figure 4:
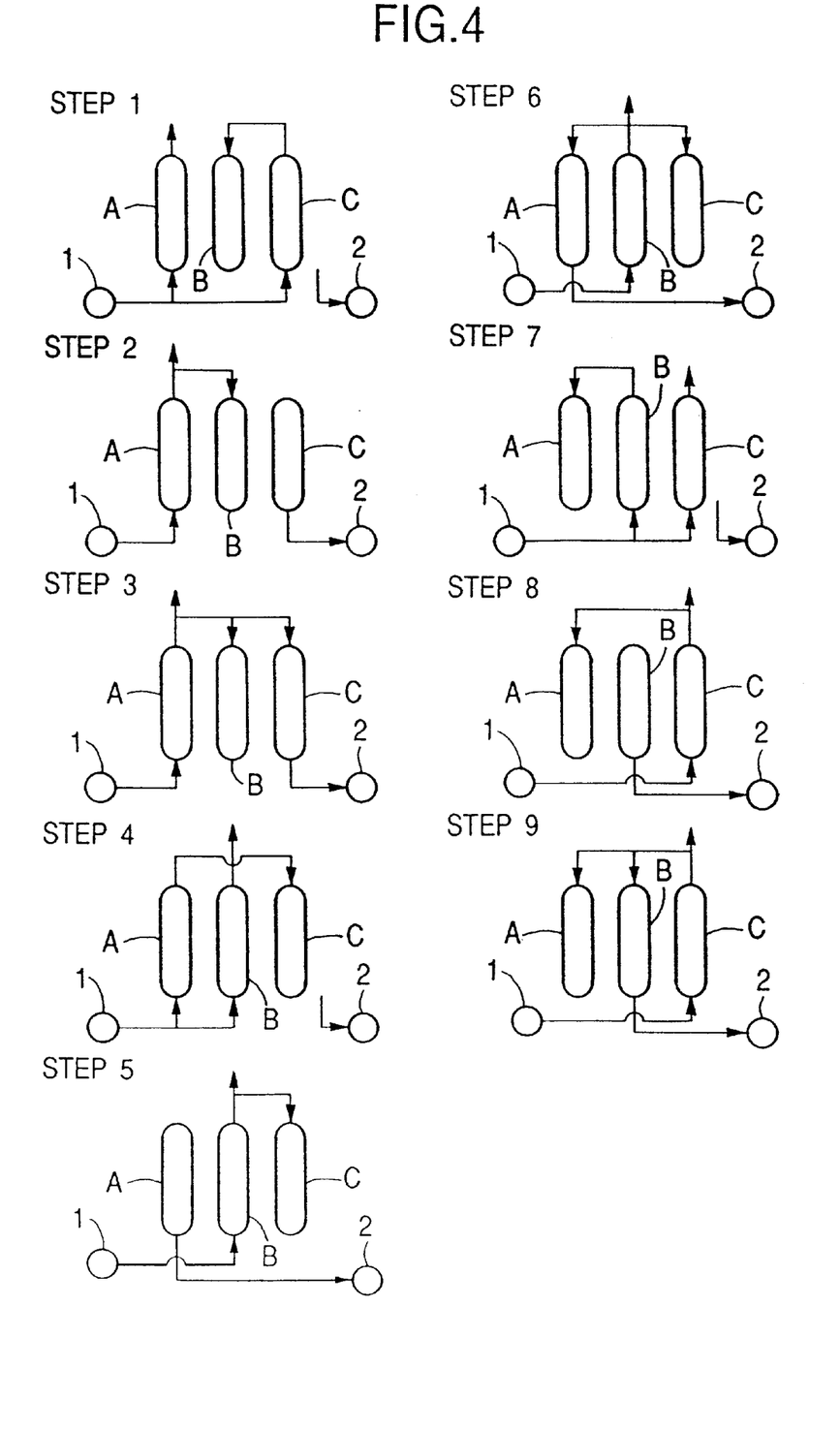
FIG. 4 is a process diagram showing the third embodiment of the present invention.

FIG. 4 is a process diagram showing the third embodiment of the present invention, which, in contrast to the above-described first embodiment, is designed so as to continue, in a pressure recovery step (pressure equalization step), introduction of feed air into an adsorption column in which the releasing of collected gas continues after an adsorption step was completed.

For example, in step 1, feed air is supplied to the feed inlet end of the adsorption column A through the valve 11a, and oxygen is removed from the valve 12a at the outlet end of the adsorption column A. The inlet end of the adsorption column C is supplied with feed air via the valve 11c, and the gas in the mass transfer zone of the adsorption column C flows out through the valve 14c at the outlet end of the column and is recovered in the adsorption column B via the valve 14b at the outlet end of the adsorption column B.

Thus, by continuing the introduction of feed air into an adsorption column which has completed an adsorption step and which is beginning a pressure recovery step, the inside pressure of this adsorption column can be maintained at the adsorption pressure, and the gas in the column can move without disorder in the gas concentration distribution in the mass transfer zone; therefore, while preventing nitrogen, which is from the upper section of this adsorption column, from getting into gas to be collected within an adsorption column which has completed a regeneration step, pressurization of an adsorption column which is to the reception side can be carried out sufficiently.

Figure 5:
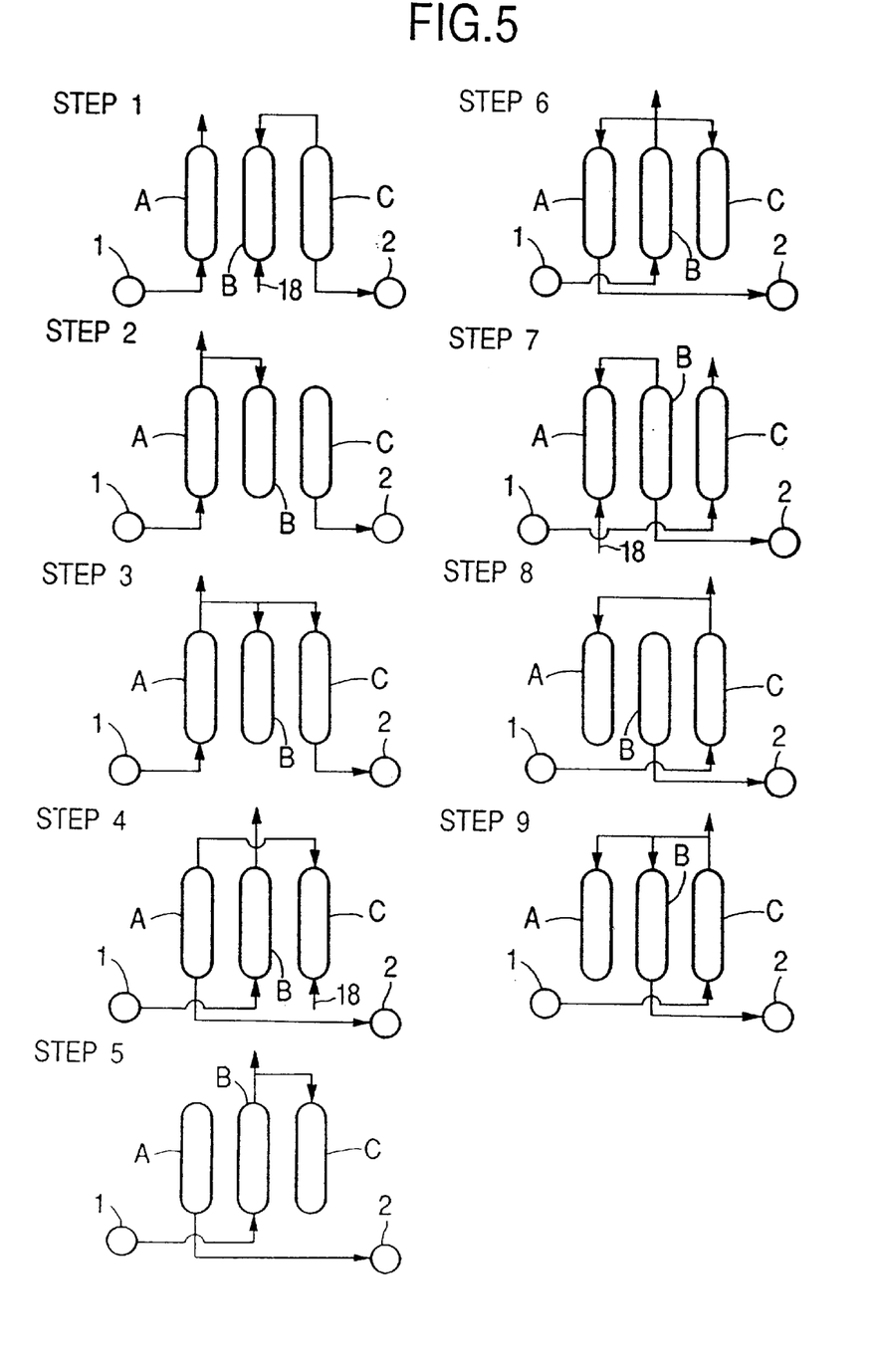
FIG. 5 is a process diagram showing the fourth embodiment of the present invention.

FIG. 5 is a process diagram showing the fourth embodiment of the present invention, which, in contrast to the above-described first embodiment, is designed in such a manner that during pressure recovery (cocurrent depressurization), collected gas is released from the column upper section in an adsorption column to the collected gas releasing side in which an adsorption step has been completed, and vacuum evacuation through the bottom of the column begins simultaneously (steps 1, 4, and 7). According to this, improvement in the efficiency can be accomplished since idle time for the vacuum pump can be eliminated.

It should be added that each embodiment may be carried out in combination with another, and furthermore, the number of adsorption columns to be used is not limited to three, however, the present invention can be employed in an apparatus of two-column type or an apparatus using four columns or more.

In addition, as the adsorbent, a zeolite may be used which adsorbs nitrogen in a great amount in preference to oxygen, such as MS-5A, MS-10X, MS-13X, and mordenite, or other zeolites may be used which have been subjected to ion exchange of metal therein so as to obtain a pore diameter which is able to adsorb nitrogen at sufficiently high adsorption rate.

Moreover, the gas mixture principally containing oxygen and nitrogen is not limited to air, and it may be a gas mixture with an arbitrary composition. When this is the case, the aforementioned air introduction pipe may be connected to a generation section or a reservoir for the gas mixture to be fed.

In the following, experimental results are explained from measuring oxygen productivity, oxygen recovery, etc., by way of carrying out the processes as explained in the above-described first to fourth embodiments and the above-described upper-lower simultaneous pressure equalization method as a conventional example, using an apparatus having the arrangement as shown in the above-described FIG. 1.

The adsorption column was of 155 mm inner diameter× 1.6 m height, and a molecular sieve 5A pellet having a diameter of 1.6 mm was used. The operational condition was such that the adsorption pressure was 500 mmAq, and the vacuum regeneration pressure was 200 Torr. Furthermore, the cycle time was set to be 60 seconds, and the duration for the step corresponding to step 1 was set to be 5–10 seconds, the duration for the step corresponding to step 2 was set to be 10–15 seconds, and the duration for the step corresponding to step 3 was set to be 40–45 seconds. The experimental results are shown in Table 1.

TABLE 1

| | Oxygen productivity | Oxygen concentration | Oxygen recovery |
|---|---|---|---|
| First embodiment | 1.00 Nm$^3$/h | 93% O$_2$ | 56% |
| Second embodiment | 1.10 Nm$^3$/h | 93% O$_2$ | 56% |
| Third embodiment | 0.95 Nm$^3$/h | 93% O$_2$ | 53% |
| Fourth embodiment | 1.15 Nm$^3$/h | 93% O$_2$ | 56% |
| Conventional example | 0.9 Nm$^3$/h | 93% O$_2$ | 54% |

As explained in the above, according to the pressure-swing-adsorption oxygen production process of the present invention, since feed gas or a gas mixture having approximately the same composition as that of feed gas is introduced during a primary pressurization step, while nitrogen is prevented from flowing into an adsorption column which has completed a regeneration step, this adsorption column can be sufficiently pressurized, and the amount of product oxygen can be increased by reducing the product oxygen amount to be used for pressurization.

In particular, by admitting feed gas or a gas mixture which has approximately the same composition as that of feed gas into an adsorption column which has completed a regeneration step without using a pressurization means such as a blower, the cost of power can be reduced in comparison with the processed amount.

Moreover, in the case when the feed gas is air, since air to be received into an adsorption column is sent at atmospheric pressure, this is excluded from the feed supply amount by means of a blower, and therefore, the oxygen recovery in practice can be notably enhanced.

What is claimed is:

1. A process for producing oxygen by means of a pressure swing adsorption separation in a plurality of adsorption columns packed with zeolite as adsorbent, an adsorption step carried out at a relatively high pressure and a regeneration step carried out at or below atmospheric pressure are repeated alternately and sequentially, whereby oxygen and nitrogen are separated from a feed gas mixture principally containing oxygen and nitrogen, and oxygen gas is produced, the process comprising the steps of:

(a) introducing the feed gas mixture into a feed-gas-mixture inlet of a first adsorption column of packed zeolite, which is capable of selectively adsorbing nitrogen in the feed gas mixture, thereby allowing primarily adsorption of nitrogen, while withdrawing oxygen, which is less adsorbable, from a product-oxygen-gas outlet of the first adsorption column as a product oxygen gas, this step being continued until a mass transfer zone of nitrogen reaches the vicinity of the product-oxygen-gas outlet of the first adsorption column;

(b) depressurizing the first adsorption column to a pressure between an adsorbing pressure and a regenerating pressure of the first adsorption column by cocurrently taking out a gas in the mass transfer zone of the first adsorption column, the gas having an oxygen concentration lower than that of the product oxygen gas and higher than that of the feed gas mixture, from the product-oxygen-gas outlet of the first adsorption column, the gas thus taken out by this step of depressurization being guided to a product-oxygen-gas outlet of a second adsorption column undergoing step (e) for repressurization;

(c) further depressurizing the first adsorption column by countercurrently evacuating it through the feed-gas-mixture inlet thereof by a vacuum pump, thereby allowing the adsorbed nitrogen to be desorbed;

(d) countercurrently purging the first adsorption column by guiding a product oxygen gas produced in another adsorption column undergoing step (a) to the product-oxygen-gas outlet of the first adsorption column so as to be supplied to the first adsorption column, whereby the desorption of the adsorbed nitrogen by the evacuation using the vacuum pump is further promoted;

(e) pressurizing the first adsorption column by countercurrently supplying the product-oxygen-gas outlet of the first adsorption column with a gas in a mass transfer zone of an adsorption column other than the first adsorption column, the gas having an oxygen concentration lower than that of a product oxygen gas and higher than that of a feed gas mixture of the adsorption column other than the first adsorption column, and at the same time by cocurrently supplying the feed-gas-mixture inlet of the first adsorption column with the feed gas mixture;

(f) further pressurizing the first adsorption column with a portion of a product oxygen gas from an adsorption column other than the first adsorption column; and (g) performing steps (a) through (f) in each of the plurality of adsorption columns in a phased sequence.

2. A process according to claim 1, wherein the gas supplied to the feed-gas-mixture inlet of the first adsorption column in step (e) is a feed gas mixture which is not compressed.

3. A process according to claim 1, wherein the cocurrent supply of the feed gas mixture to the feed-gas-mixture inlet of the first adsorption column with in step (e) is continued in step (f).

4. A process according to claim 3, wherein the gas supplied to the feed-gas-mixture inlet of the first adsorption column in steps (e) and (f) is a feed gas mixture which is not compressed.

5. A process according to claim 1, wherein step (b) is conducted by depressurizing the first adsorption column to a pressure between an adsorbing pressure and a regenerating pressure of the first adsorption column by cocurrently taking out a gas in the mass transfer zone of the first adsorption column, the gas having an oxygen concentration lower than that of the product oxygen gas and higher than that of the feed gas mixture, from the product-oxygen-gas outlet of the first adsorption column, and at the same time by countercurrently evacuating the first adsorption column through the feed-gas-mixture inlet thereof by a vacuum pump; the gas thus taken out from the product-oxygen-gas outlet of the first adsorption column by the depressurization in step (b) being guided to a product-oxygen-gas outlet of a second adsorption column undergoing step (e) for repressurization.

6. A process for producing oxygen by means of a pressure swing adsorption separation in a plurality of adsorption columns packed with zeolite as adsorbent, an adsorption step carried out at a relatively high pressure and a regeneration step carried out at or below atmospheric pressure are repeated alternately and sequentially, whereby oxygen and nitrogen are separated from a feed gas mixture principally containing oxygen and nitrogen, and oxygen gas is produced, the process comprising the steps of:

(a) introducing the feed gas mixture into a feed-gas-mixture inlet of a first adsorption column of packed zeolite, which is capable of selectively adsorbing nitrogen in the feed gas mixture, thereby allowing primarily adsorption of nitrogen, while withdrawing oxygen, which is less adsorbable, from a product-oxygen-gas outlet of the first adsorption column as a product oxygen gas, this step being continued until a mass transfer zone of nitrogen reaches the vicinity of the product-oxygen-gas outlet of the first adsorption column;

(b) cocurrently taking out a gas in the mass transfer zone of the first adsorption column, the gas having an oxygen concentration lower than that of the product oxygen gas and higher than that of the feed gas mixture, from the product-oxygen-gas outlet of the first adsorption column, while supplying the feed-gas-mixture inlet of the first adsorption column with a compressed feed gas mixture so as to avoid depressurization in the first adsorption column, the gas thus taken out by this step being guided to a product-oxygen-gas outlet of a second adsorption column undergoing step (e) for repressurization;

(c) depressurizing the first adsorption column by countercurrently evacuating it through the feed-gas-mixture inlet thereof by a vacuum pump, thereby allowing the adsorbed nitrogen to be desorbed;

(d) countercurrently purging the first adsorption column by guiding a product oxygen gas produced in another adsorption column undergoing step (a) to the product-oxygen-gas outlet of the first adsorption column so as to be supplied to the first adsorption column, whereby the desorption of the adsorbed nitrogen is further promoted;

(e) pressurizing the first adsorption column by countercurrently supplying the product-oxygen-gas outlet of the first adsorption column with a gas in a mass transfer zone of an adsorption column other than the first adsorption column, the gas having an oxygen concentration lower than that of a product oxygen gas and higher than that of a feed gas mixture of the adsorption column other than the first adsorption column;

(f) further pressurizing the first adsorption column with a portion of a product oxygen gas from an adsorption column other than the first adsorption column; and (g) performing steps (a) through (f) in each of the plurality of adsorption columns in a phased sequence.

7. A process for producing oxygen by means of a pressure swing adsorption separation in a plurality of columns packed with zeolite as adsorbent, an adsorption step carried out at a relatively high pressure and a regeneration step carried out at or below atmospheric pressure are repeated alternately and sequentially, whereby oxygen and nitrogen are separated from a gas mixture principally containing oxygen and nitrogen, and oxygen gas is produced, the process comprising the steps of:

conducting pressure recovery in which communication is provided between an outlet end of a column which has completed said adsorption step and an outlet end of a column which has completed said regeneration step, and in which gas remaining in the column which has completed said adsorption step is collected in the column which has completed said regeneration step; and simultaneously with said pressure recovery, introducing said gas mixture into at least one of the column which has completed said adsorption step and the column which has completed said regeneration step through the inlet end thereof.

8. A process according to claim 7, wherein said column into which the gas mixture is introduced is the column which has completed the adsorption step, and the gas mixture is introduced at approximately the same pressure as that in the adsorption step.

9. A process for producing oxygen by means of a pressure swing adsorption separation in a plurality of columns packed with zeolite as adsorbent, an adsorption step carried out at a relatively high pressure and a regeneration step carried out at or below atmospheric pressure are repeated alternately and sequentially, whereby oxygen and nitrogen are separated from a gas mixture principally containing oxygen and nitrogen, and oxygen gas is produced, the process comprising the steps of:

conducting pressure recovery in which communication is provided between an outlet end of a column which has completed said adsorption step and an outlet end of a column which has completed said regeneration step, and in which gas remaining in the column which has completed said adsorption step is collected in the column which has completed said regeneration step; and simultaneously with said pressure recovery, introducing said gas mixture into the column which has completed said regeneration step through the inlet end thereof, while the inlet end of the column which has completed said adsorption step is closed.

10. A process for producing oxygen by means of a pressure swing adsorption separation in a plurality of columns packed with zeolite as adsorbent, an adsorption step carried out at a relatively high pressure and a regeneration step carried out at or below atmospheric pressure are repeated alternately and sequentially, whereby oxygen and nitrogen are separated from a gas mixture principally containing oxygen and nitrogen, and oxygen gas is produced, the process comprising the steps of:

conducting pressure recovery in which communication is provided between an outlet end of a column which has completed said adsorption step and an outlet end of a column which has completed said regeneration step, and in which gas remaining in the column which has completed said adsorption step is collected in the column which has completed said regeneration step; and simultaneously with said pressure recovery, introducing said gas mixture into the column which has completed said adsorption step through the inlet end thereof, while the inlet end of the column which has completed said regeneration step is closed.

11. A process for producing oxygen by means of a pressure swing adsorption separation in a plurality of columns packed with zeolite as adsorbent, an adsorption step carried out at a relatively high pressure and a regeneration step carried out at or below atmospheric pressure are repeated alternately and sequentially, whereby oxygen and nitrogen are separated from a gas mixture principally containing oxygen and nitrogen, and oxygen gas is produced, the process comprising the steps of:

conducting pressure recovery in which communication is provided between an outlet end of a column which has completed said adsorption step and an outlet end of a column which has completed said regeneration step, and in which gas remaining in the column which has completed said adsorption step is collected in the column which has completed said regeneration step; and simultaneously with said pressure recovery, introducing said gas mixture into both the column which has completed said adsorption step and the column which has completed said regeneration step through inlet ends of both columns respectively.

* * * * *